United States Patent

[11] 3,573,752

[72] Inventors Evangelo Lyghounis
Milan;
Isidoro Poretti, Castiglione Olona, Italy
[21] Appl. No. 838,162
[22] Filed July 1, 1969
[45] Patented Apr. 6, 1971
[73] Assignee Societa Italiana Telecommunicazioni Siemens S.p.A.
Milan, Italy
[32] Priority July 3, 1968
[33] Italy
[31] 18,518/68

[54] PULSE-CODE-MODULATION SYSTEM WITH CONVERGING SIGNAL PATHS
6 Claims, 9 Drawing Figs.

[52] U.S. Cl. .......... 340/172.5, 179/15
[51] Int. Cl. .......... H04j 3/12
[50] Field of Search .......... 340/172.5, 146.1; 235/157; 179/15

[56] References Cited

UNITED STATES PATENTS 3,136,861 6/1964 Mayo .......... 179/15
3,289,169 11/1966 Marosz .......... 340/172.5
3,441,674 4/1969 Giordano et al. .......... 179/15
3,508,006 4/1970 Martens .......... 179/15

*Primary Examiner*—Gareth D. Shaw
*Assistant Examiner*—Sydney Chirlin
*Attorney*—Karl F. Ross

ABSTRACT: At a point of convergence of several transmission paths, each carrying a multiplicity of channels in the form of interleaved code signals, recurring at different repetition frequencies, selected channels from different incoming paths are sampled at a rate equal to or higher than the highest repetition frequency among these channels for transfer to an outgoing transmission path. Whenever a channel is resampled before arrival of the next code signal thereof, a special control pulse indicates this fact and actuates a discriminating circuit at the remote end of the outgoing path to prevent the registration of a spurious code signal in a memory section assigned to such channel, thereby making the mean rate of registration equal to the original repetition frequency of the signals constituting this channel. The signals so stored can be read out, at an accelerated rate (if necessary), for further retransmission in the aforedescribed way or for decoding at a terminal.

Evangelo Lyghounis
Isidoro Poretti
INVENTORS.

BY
Karl F. Ross
Attorney

INVENTORS:
Evangelo Lyghounis
Isidoro Poretti

BY

Karl F. Ross
Attorney

INVENTORS:
Evangelo Lyghounis
Isidoro Poretti

BY Karl F. Ross
Attorney

PULSE-CODE-MODULATION SYSTEM WITH CONVERGING SIGNAL PATHS

Our present invention relates to a communication system in which various terminals are interconnected by transmission paths carrying each a multiplicity of channels in the form of interleaved code signals, e.g., of the digital or the time-modulated type, These paths converging at one or more junctions or nodal points for the rerouting of incoming channels in different combinations over one or more outgoing transmission paths to a remote destination such as a further junction or a receiving terminal.

Frequently, in such systems, the code signals complex the interleaved channels of different transmission pats do not have the same repetition frequency so that their selective regrouping for retransmission over a common outgoing path involves difficulties. In prior systems of this description, therefore, the signals arriving at a junction from different points of origin had to be decoded and reencoded preparatorily to their rerouting to a common destination. This operation requires complex equipment at each junction and tends to impair the fidelity of message retransmission.

The general object of our invention, therefore, is to provide an improved communication system of the aforedescribed kind, e.g. for telephone circuits operating on the principle of shared time, in which the need for coding and reencoding is avoided.

If, for this purpose, code signals arriving at a junction are temporarily stored in respective memory sections or registers assigned to the individual channels, these registers can be sampled at a rate equal to or higher than the highest repetition rate of the signals of the channels concerned, in order to avoid loss of information, preparatorily to retransmission. Such retransmission at a higher cadence would generate, at the receiving point, certain spurious signals due to repetitive sampling of a register prior to the entry of a new code signal if, as will necessarily be the case at least with some channels, these signals follow one another at a rate slower than the sampling rate. A further object of our invention, therefore, is to provide means for suppressing such spurious signals.

In the case of repeated rerouting through two or more junction points, increasingly higher sampling rates would be required in such a system to allow for variations in the repetition frequencies of the channels converging at the further junctions. This may lead to an intolerable acceleration of the sampling process unless the number of consecutive reroutings is held within predetermined limits. Our invention aims at avoiding the need for such limitation of the number of junctions to be transversed by the interleaved code signals.

These objects are realized, pursuant to our invention, by the provision of reading means at each junction for periodically sampling selected registers—associated with message channels to be rerouted—of several memories receiving the code signals from two or more incoming paths, at a rate at least equal to the highest repetition frequency concerned, in combination with sensing means for determining the presence or absence of a new signal in a previously sampled register and, in the absence of such new signal, for generating a characteristic marker pulse in a time slot reserved for the corresponding channel; at the remote destination point, which may be a terminal or another junction, a discriminating circuit responds to this marker pulse to inhibit the operation of a utilization means, such as a transfer switch or a decoder, with resulting suppression of the tagged code and extraction of the retransmitted signals of any channel at a mean rate corresponding to their original repetition frequency.

The sensing means may be actuated by registration pulses from a first timer, controlling the storage of incoming signals in the corresponding memory section, and by reading pulses from a second timer, controlling the sampling of registered signals to be retransmitted; thus, according to a more specific feature of our invention, a bistable element or flip-flop may be set by a registration pulse and reset by a reading pulse which transfers the registered signals to storage elements of the reader preparatorily to sampling, the reset state of the flip-flop indicating the absence of an intervening registration since the preceding sampling. With registers of the magnetic-core type, for example, where the reading pulse leaves each register stage in the O state, the intrusion of spurious all-zero code combinations into the transmitted message is thereby prevented.

At the remote point, according to another advantageous feature of our invention, the interleaved signals of a composite train derived from different paths converging at the preceding junction are stored in a first group of registers at the accelerated rate of retransmission and are then transferred to a second group of registers, forming part of a buffer memory, at reduced mean rates (corresponding to their original repetition frequencies) because of the suppression of spurious signals through the aforedescribed discriminating means. If this remote point is a receiving terminal, the first group of registers may form part of a decoder and may be constituted by condensers for the capacitive storage of code pulses to be integrated in the output of the buffer memory for reconstitution of audio signals which were translated into code pulses at the originating terminal. If, however, this remote point is another junction, the signals appertaining to channels to be retransmitted to a further point are read out from the buffer memories of two or more converging paths at an accelerated rate determined by the highest repetition frequency, under the control of still another timer, with inclusion of a characteristic pulse or marker as described above.

In this way, the signals of any number of message channels from an equal or lesser number of originating terminals may be selectively routed through one or more junctions to a variety of destinations; regardless of the number of intervening junctions, the mean cadence of the code signals of any channel at the final point will be the same as their rate of original transmission.

If the code signals are of the digital type, consisting of a fixed reference pulse and a predetermined number of bits represented by the presence or absence of pulses in as many time positions, the marker pulse may be an added bit in a further time position having one value (preferably 0) in the case of a real signal and another value (preferably 1) in the case of a spurious signal. If signal amplitude is indicated by the relative spacing of a fixed reference pulse and a variable information pulse, a shifting of the latter pulse to a time position outside its normal range may be used as the marker characterizing a spurious signal.

The above and other features of our invention will be described hereinafter in greater detail with reference to the accompanying drawing in which.

Figures 1, 2, 5:
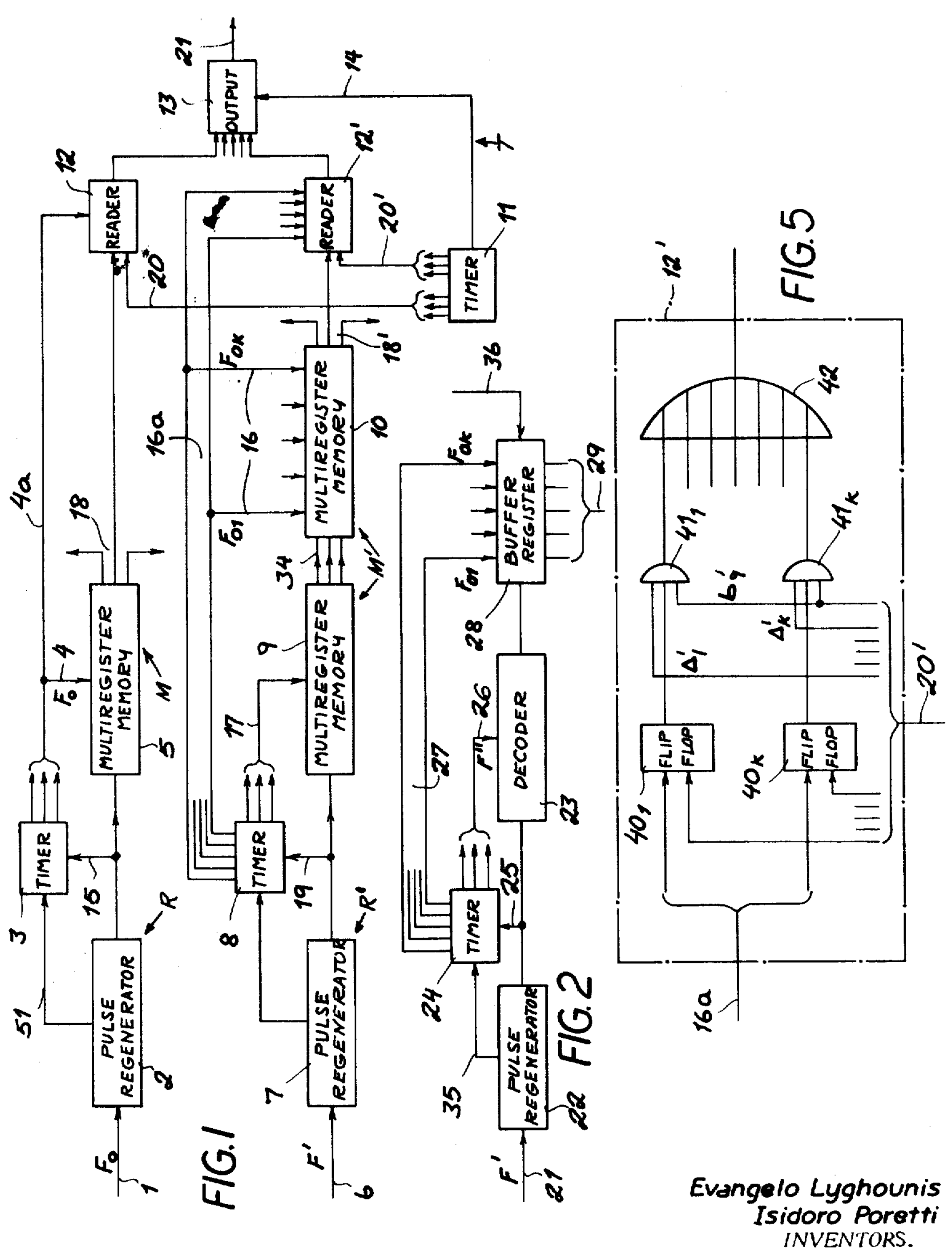
FIG. 1 is a block diagram of a junction of two incoming transmission paths and one outgoing transmission paths in a system embodying our invention.
FIG. 2 is a block diagram of a decoding network adapted to be included in the junction of FIG. 1.
Figure 4B:
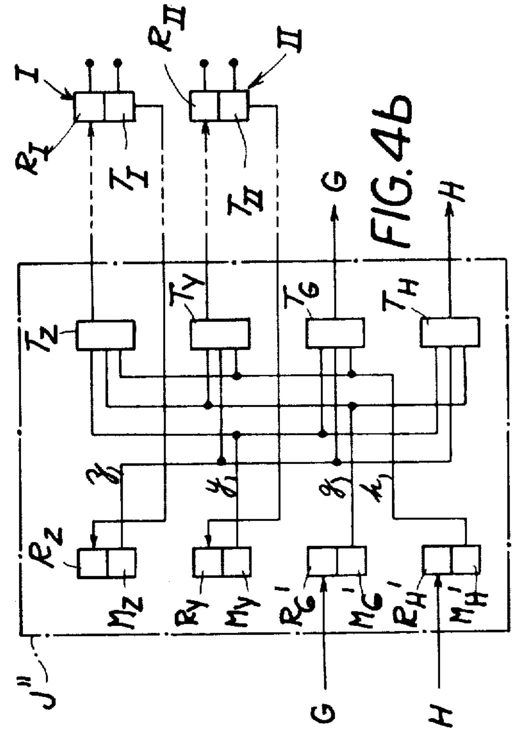
Figure 4A:
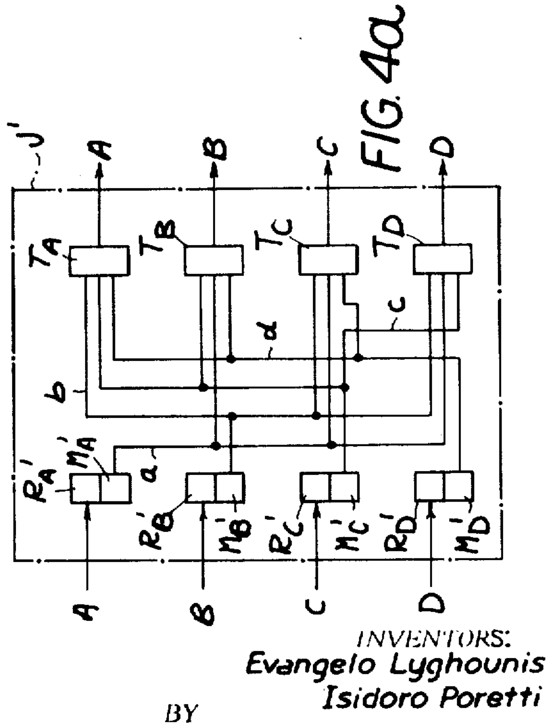
Figure 6:
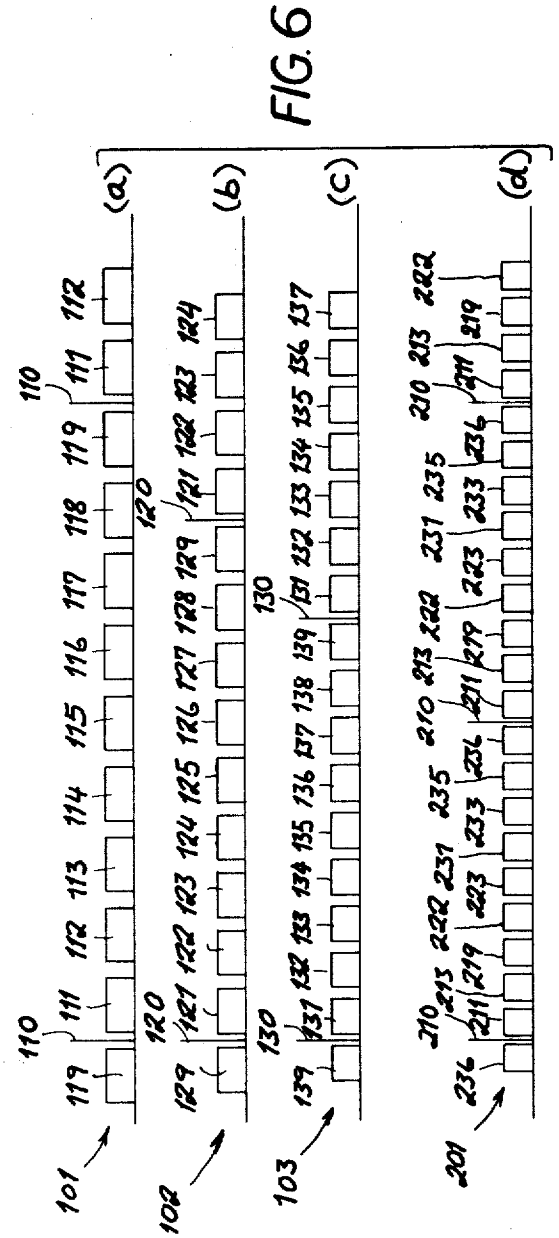
Figure 7:
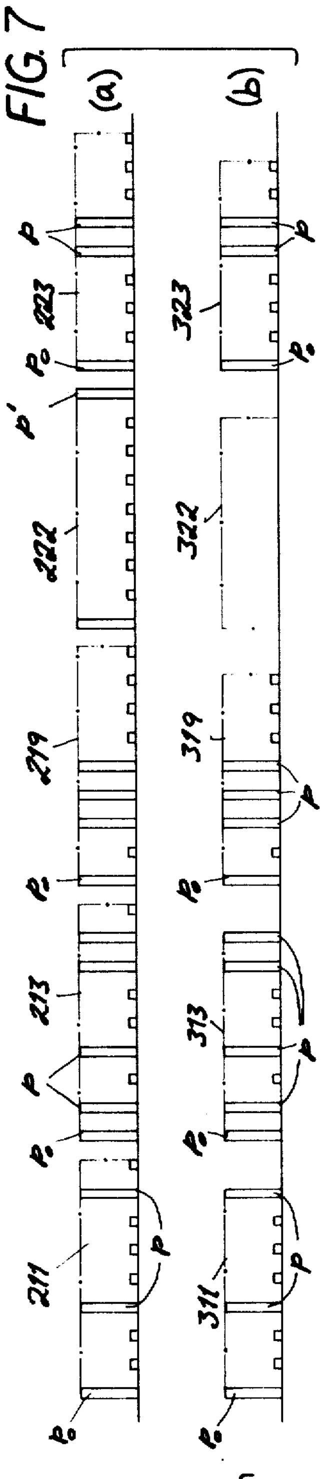
Figure 8:
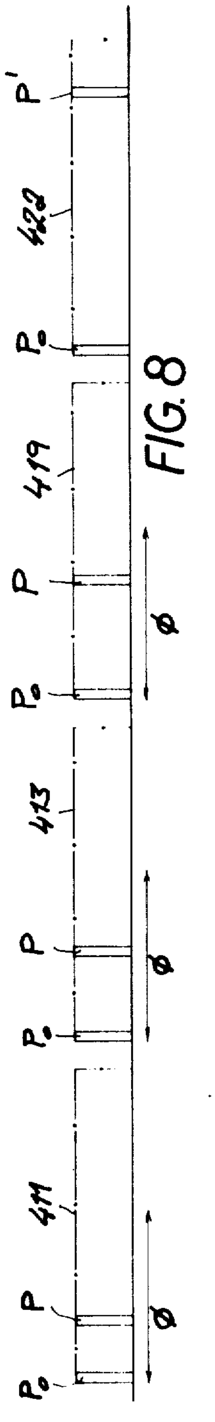

FIGS. 4*a* and 4*b* schematically illustrate the layouts of two communication systems including junctions of the type illustrated in FIG. 1;

FIG. 5 is a more detailed circuit diagram of a reader with sensing means forming part of the junction of FIG. 1; and FIGS. 6—8 show pulse trains to be used in a system according to our invention.

In FIG. 1 we have diagrammatically illustrated a junction between two incoming transmission paths 1, 6 and an outgoing transmission path 21, it being understood that paths 1, 6 are representative of any number of such paths and that path 21 may also be duplicated any number of times. It will be assumed, for simplicity, that incoming paths 1 and 6 carry K channels each and that outgoing path 21 is also designed for K channels, selected from among the channels of these incoming paths. Each channel consists of a succession of code signals interleaved with the (K-1) mode signals of the other channels traveling over the same path from a common point of origin, not shown, to diverse destinations, one such destination being served by the path 21. The signals of each channel of path 1 recur at a relatively low cadence or repetition frequency $F_o$; the signals of each channel of path 6 have a relatively high repetition frequency $F'$. Path 1 may originate at a transmitting terminal operating at cadence $F_o$; path 6, on the other hand, is presumed to come from a junction where its constituent channels, stemming from different transmitting terminals with original cadences $F_{oI}$—$F_{oK}$, are sampled for retransmission at the repetition frequency $F'$ equaling or exceeding the highest one of these original cadences. Naturally, not all the cadences $F_{oI}$—$F_{oK}$ need differ from one another.

The incoming code signals are regenerated in a unit 2 for the path 1 and in a unit 7 for the path 6; they include reference pulses (one for each code signal) and synchronizing pulses (one per cycle of K signals) which are fed to a respective timer 3 or 8 via connections indicated at 51 and 15 for path 1 and at 52 and 19 for path 6. The timers, in turn, control respective multiregister memories 5, 9 of K sections each, via multiples 4 and 17, these memory sections constituting individual registers with as many stages as there are pulse positions in the signal code employed, e.g., eight stages for a reference pulse and seven bits; the registers of memory 9 include an additional (ninth) stage for an indexing pulse which characterizes the arriving code signals as either true or spurious. Timer 8 is provided with a further output multiple 16 controlling the transfer of the contents of receiving memory 9 to a buffer memory 10, by way of a multiple 34, at means rates corresponding to the original cadences $F_{oI}$—$F_{oK}$.

Memories 5 and 10 have output multiples 18 and 18' leading to respective readers 12 and 12' (only one of each being shown) which, under the control of output multiples 20, 20' of a further timer 11, periodically sample the contents of selected registers of these memories at a rate $F''$ which should be at least equal to the highest one of the repetition frequencies ($F_o$ and some of $V_{oI}$—$V_{oK}$) of the channels to be rerouted over path 21; thus, if desired, $F''$ may be equal to $F'$. The readers 12 and 12' are also controlled from timers 3 and 8, respectively, via extensions 4a and 16a of multiples 4 and 16. A synchronizing pulse arrives once per cycle, via a lead 14, from timer 11 at an output stage 13 which directs the outputs of all the associated readers, in interleaved relationship, onto outgoing path 21.

Thus, the circuit arrangement of FIG. 1 includes receiving sections R and R' with units 2, 3 and 7, 8, memory sections M and M' with units 5 and 9, 10, and a transmitting section T with units 11, 12, 12' and 13.

Reference will now be made to FIG. 6 for a description of representative pulse trains entering and leaving the junction of FIG. 1. Graph (*a*) of FIG. 6 shows a pulse train 101 formed from nine interleaved channels or signal trains 111—119, together with synchronizing pulses 110 of larger amplitude, recurring at a relatively slow cadence; graph (*b*) illustrates a pulse train 102 consisting of interleaved channels 121—129, accompanied by synchronizing pulses 120, having a somewhat higher recurrence rate; graph (*c*) represents a pulse train 103 (channels 131—139 and synchronizing pulses 130) of relatively high repetition frequency. Graph (*d*) of FIG. 6 shows a composite outgoing train 201 consisting, apart from synchronizing pulses 210, of nine channels selected from the three incoming trains 101, 102, 103, i.e., three channels from train 101 represented by signals 211, 213, 219, two channels from train 102 represented by signals 222, 223, and four channels from train 103 represented by signals 231, 233, 235, 236. The repetition frequency or cadence of train 201 is higher than that of any of trains 101, 102, 103. Graphs (*a*), (*b*), (*c*) may represent the messages respectively traveling over path 1, another incoming path not shown in FIG. 1, and path 6; graph (*d*) represents the messages leaving the junction of FIG. 1 via path 21. It will be understood that the remaining channels of the several incoming paths are rerouted, in selected combinations, over other outgoing paths advantageously having the same capacity here taken as K=9.

Each of the code signals 111—119 etc. shown in FIG. 6 comprises, basically, a reference pulse $P_o$ in the No. 1 position, up to seven digital pulse $p$ whose presence or absence signifies a value 1 or 0, respectively, for a corresponding number of bits, and (at least in the cases of pulse trains 103 and 201) a characteristic pulse or control bit $p'$ in the No. 9 position, all as illustrated for the signals 211, 213, 219, 222, 223 of train 201 in graph (*a*) of FIG. 7. Signals 211, 213, 219 and 223 are true codes, extracted by reader 12 of FIG. 1 from memory 5 immediately upon the storage of the corresponding signals 111, 113, 119 on the assigned registers of that memory, whereas signal 222 is here of the spurious variety, resulting from the scanning of a register by a similar reader after that register had been cleared in a preceding cycle and before a new code signal was entered therein. Signal 223 is again a true signal from another register sampled by the last-mentioned reader. It will be noted that the control bit $p'$ is present only in the spurious signal 222, which is devoid of all significant code pulses, and is missing in the true signals 211, 213, 219 and 223. Graph (*b*) of FIG. 7 illustrates the same signals, here designated 311, 313, 319, 322, 232, after transfer from a receiving memory (similar to memory 9) to a buffer memory (similar to memory 10) at the remote end of path 21, with suppression of the control bit $p'$ in signals 311, 313, 319, 323 and complete blanking of the signal 322. Reference pulse $p_o$, shown included in these latter signals, need not be transferred to the buffer memory.

The remote point just referred to may be a terminal of the type illustrated in FIG. 2, designed to demodulate the incoming code combinations for converting them into low-frequency signals (e.g., for voice transmission). This terminal includes a pulse regenerator 22, similar to units 2 and 7 of FIG. 1, whose output controls via leads 25, 35 a timer 24 analogous to unit 8 (as more fully described hereinafter with reference to FIG. 3). Timer 24 has two output multiples 26 and 27 respectively serving for the storing of analogue voltages (determined by the incoming code pulses) on capacitive stages of a receiving memory 23, serving as a decoder, and for the transfer of the condenser charges to similar storage means in a buffer memory 28 having an output circuit 29 which includes the usual low-pass filters and integrating networks not shown. As described with reference to the analogous memories 9, 10 in the junction of FIG. 1, the incoming signals are stored at an accelerated rate F'' in decoder F'' and, owing to the suppression of spurious signals, are transferred to the corresponding registers of memory 28 at means rates $F_{o1}$—$F_{oK}$ equal to their original repetition frequencies. The final readout, under the control of a multiple 36 from a reader not shown, takes place again at an accelerated rate preferably having the same magnitude F''. Since the condensers of memory 28 are not discharged by the readout, no spurious signals are developed in the output circuit 29 of that memory despite the higher sampling rate.

Figure 3:
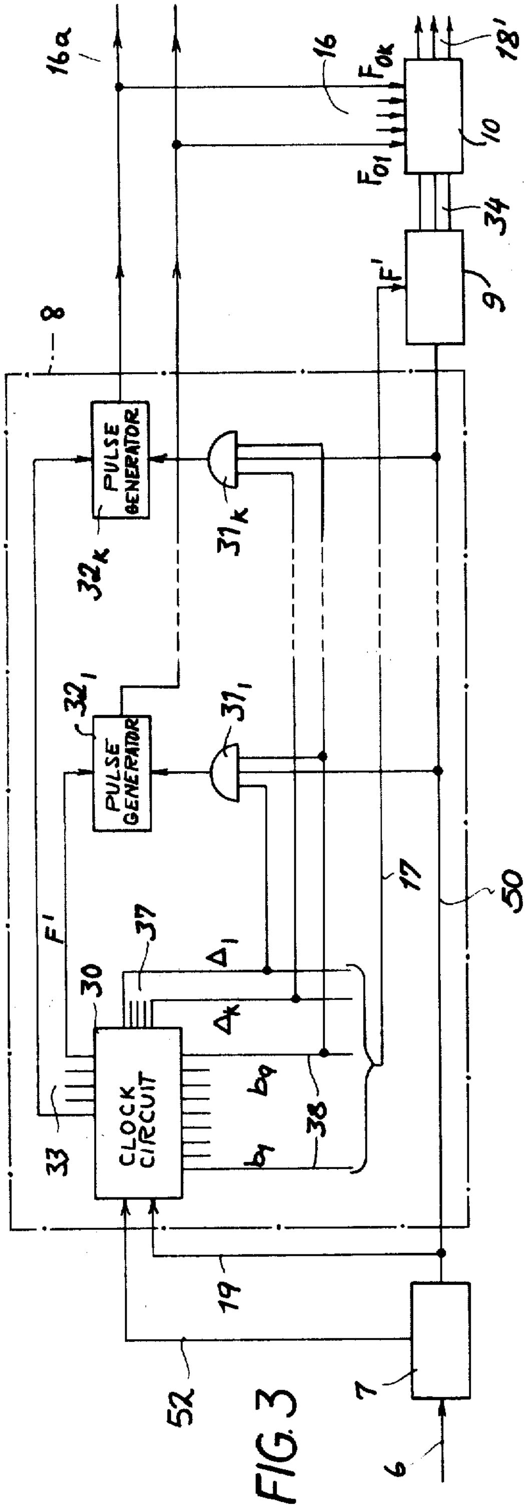
FIG. 3 is a more detailed circuit diagram of a timer and associated elements forming part of the junction of FIG. 1.

FIG. 3 illustrates details of timer 8. A clock circuit 30, locked in on the incoming code signals by the periodic synchronizing pulses 130 (FIG. 6) on lead 19 and by more rapidly recurring reference pulse $p_o$ (FIG. 7) on lead 52, generates a succession of channel pulses $\Delta_1$—$\Delta_K$ on a set of output leads 37 and, during each channel pulse, a succession of counting pulses $b_1$—$b_9$ on a set of output leads 38 to establish the several bit positions. Clock circuit 30 also has an output multiple 33 whose K leads are connected to respective pulse generators $32_1$—$32_K$, one for each channel, to actuate same in the absence of an inhibiting signal applied thereto from an associated AND gate $31_1$—$31_K$; the clock pulses on leads 33 recur at the cadence F'. Each AND gate $31_1$—$31_K$ has three inputs, i.e., a first input receiving the corresponding channel pulse $\Delta_1$—$\Delta_K$, a second input receiving the counting pulse $b_9$ and a third input connected to the output line 50 of pulse regenerator 7, so as to become conductive whenever a pulse is present on that line in the No. 9 position of a time slot assigned to any of the channels carried on path 6. Thus, the occurrence of such a characteristic pulse, similar to pulse $p'$ shown in graph (*a*) of FIG. 7, blocks the appearance of a transfer pulse in the output lead of the corresponding pulse generator forming part of the multiple 16; as a result, the all-zero code (similar to signal 222) then stored on the seven digital stages of the assigned register in memory 9 is not transferred to memory 10. If the pulse generators $32_1$—$32_K$ are not inhibited, such transfer takes place in the No. 9 position of the respective time slot.

FIG. 5 illustrates how the reader 12' of FIG. 1 (or a similar reader at the transmitting end of path 6) generates the control bit $p'$ (FIG. 7) to mark a spurious signal. A series of flip-flops $40_1$—$40_K$, one for each channel, have setting inputs connected to respective leads of multiple *16a* emanating from timer 8, the resetting inputs of these flip-flops being periodically energized by reading pulses carried on respective conductors of multiple 20'. These reading pulses, which serve to transfer the contents of corresponding registers of memory 10 to respective groups of storage elements (e.g., magnetic cores or condensers) of reader 12', may occur in the No. 1 positions of the nine-bit digital codes shown in FIG. 7, graph (*a*), and may be used to generate the reference pulses $p_0$ of the outgoing pulse train. Flip-flops $40_1$—$41_K$ respond to these setting and resetting pulses with a delay at least equal to a sampling interval $\Delta'$ of timer 11 so that, upon the occurrence of clock pulses $b_2'$—$b_9'$ emitted by that timer, the respective flip-flop is still in its set state if a transfer from memory 10 to reader 12' had taken place since the last-preceding sampling of the storage elements of the reader. A set of triple AND gates $41_1$—$41_K$, respectively associated with flips $40_1$—$41_K$, receive on one input the "reset" outputs of these flip-flops on another input the corresponding channel pulses $\Delta_1'$—$\Delta_K'$ from timer 11, and on a third input the counting pulses $b_9'$ thereof. These AND gates, therefore, conduct only if the associated flip-flop happens to be reset in the No. 9 time position of any signal of the corresponding signal and, in that case, deliver the marking pulse $p'$ to an OR gate 42 which also receives the digital code pulses developed in positions Nos. 2 through 8 by the testing of the storage elements of the reader under the control of the clock pulses of timer 11.

The number of active flip-flops and AND gates as shown in FIG. 5 will generally be less than the number K of channels carried on path 8, e.g., four (with K=9) in the example described with reference to FIG. 6.

A buffer memory, similar to memory 10, may also be connected in cascade with memory 5 of FIG. 1 to receive simultaneously all the code pulses sequentially stored in a register of memory 5 for the purpose of preventing a readout while the contents of such register are being changed.

In FIGS. 4*a* and 4*b* we have diagrammatically illustrated several possibilities of routing messages between different points of a communication system with the aid of junctions J' and J'' including receiving, memory and transmitting sections similar to those shown in FIG. 1. In FIG. 4*a*, capital letters A, B, C, D represent several other junctions transmitting messages to one another via junction J' which includes receiving sections $R_A'$, $R_B'$, $R_C'$, $R_D'$, memory sections $M_A'$, $M_B'$, $M_C'$, $M_D'$ and transmitting sections $T_A$, $T_B$, $T_C$, $T_D$ respectively assigned to these junctions; the corresponding lowercase letters *a, b, c, d* denote the various crossconnections between these sections. In FIG. 4*b*, receiving, memory and transmitting sections $R_Z$, $M_Z$, $T_Z$ and $R_Y$, $M_Y$, $T_Y$ are respectively assigned to two external terminals I, II, each including its own receiving and transmitting sections $R_I$, $T_I$ and $R_I$I, $T_I$I, whereas other junctions G, H cooperate with sections $R_G'$, $M_G'$, $T_G$, and $R_H'$, $M_H'$, $T_H$. Again the internal connections are designated by corresponding lowercase letters *q, h, y, Z*. In each instance, two-way communication between four points can be selectively carried out.

FIG. 8 depicts the possibility of applying the aforedescribed technique to a pulse-code-modulation system in which interleaved signals 411, 413, 419, 422, forming part of a composite outgoing train analogous to that of graph (*a*) of FIG. 7, are constituted by reference pulses $P_0$ and single code pulses $p$ whose mutual spacing represents an instantaneous amplitude to be transmitted. In the true signals 411, 413 and 419, pulse $P$ is shiftable within a range $\Phi$; in the spurious signal 422, the corresponding pulse $P'$ is positioned outside that range to represent a marker analogous to control bit P'.

In a typical practical mode of realization, the maximum sampling period may be about 125 microsecond (corresponding to a minimum repetition frequency of 8,000 c.p.s.), with 24 channels per transmission path. With nine bits per channel and one synchronizing pulse per cycle, the minimum cadence then is 1,736,000 bits per second.

It will thus be seen that we have provided a system in which a multiplicity of communication channels, leaving their originating terminals or preceding nodal points at different repetition frequencies, can be selectively recombined at a further junction or succession of junctions for routing to common destinations in interleaved relationship and, therefore, at identical cadences.

We claim:

1. In a communication system comprising a plurality of incoming transmission paths converging at a junction and at least one outgoing transmission path leaving said junction, each of said paths being adapted to carry a multiplicity of message channels in the form of interleaved code signals recurring at different repetition frequencies in the several paths, the combination therewith of:

memory means at said junction for each incoming path having respective registers assigned to said channels for temporarily storing the signals thereof;

reading means at said junction for periodically sampling selected registers of at least some of said memory means at a rate at least equal to the highest repetition frequency among the channels assigned to the sampled registers to constitute a composite train of interleaved signals for retransmission over said outgoing path to a remote destination;

sensing means in said reading means for detecting the absence of a new signal in a previously sampled register upon resampling thereof and for generating a characteristic pulse in a time slot reserved for the corresponding channel;

utilization means at said remote destination for extracting the signals of any channel retransmitted over said outgoing path; and discriminating means at said remote destination responsive to said characteristic pulse for inhibiting said utilization means to prevent the extraction of a spurious signal whereby the retransmitted signals of any channel are extracted at a mean rate corresponding to their original repetition frequency.

2. The combination defined in claim 1, further comprising first timer means at said junction for controlling the storage of incoming signals in said memory means and second timer means at said junction for controlling the sampling of stored signals to be retransmitted over said outgoing path, said sensing means being responsive to registration pulses from said first timer means and to reading pulses from said second timer means.

3. The combination defined in claim 2 wherein said sensing means comprises a bistable element for each channel settable by a registration pulse and resettable by a reading pulse.

4. The combination defined in claim 3 wherein said second timer means has an output in the form of clock pulses establishing a plurality of time positions for code pulses constituting any signal to be retransmitted, said output controlling said sensing means for generating said characteristic pulse in a predetermined time position of a retransmitted signal.

5. The combination defined in claim 1 wherein said utilization means includes other memory means with a first and a second register for each retransmitted channel and timer means for generating transfer pulses to shift any retransmitted signal from said first register to said second register upon storage thereof in said first register, said discriminating means being connected to said timer means for inhibiting the generation of a transfer pulse in response to said characteristic pulse.

6. The combination defined in claim 5 wherein said utilization means further includes decoding means with pulsestoring means forming part of said first register and a load circuit connected in the output of said second register.